(12) United States Patent
Grant et al.

(10) Patent No.: US 10,703,302 B1
(45) Date of Patent: Jul. 7, 2020

(54) COUPLING SYSTEM

(71) Applicant: Portable Multimedia Ltd, West End Surrey (GB)

(72) Inventors: Robert George Grant, West End Surrey (GB); Graham Keith Lambert, West End Surrey (GB); Ceri Hill, West End Surrey (GB)

(73) Assignee: Portable Multimedia Ltd (GB)

( * ) Notice: Subject to any disclaimer, the term of this patent is extended or adjusted under 35 U.S.C. 154(b) by 0 days.

(21) Appl. No.: 16/263,415

(22) Filed: Jan. 31, 2019

(30) Foreign Application Priority Data

Jan. 7, 2019 (GB) ..................................... 900214.6

(51) Int. Cl.
*G03B 17/56* (2006.01)
*B60R 11/04* (2006.01)
*B60R 11/00* (2006.01)

(52) U.S. Cl.
CPC ............ *B60R 11/04* (2013.01); *G03B 17/561* (2013.01); *B60R 2011/007* (2013.01)

(58) Field of Classification Search
USPC ........................................ 396/419; 248/187.1
See application file for complete search history.

(56) References Cited

U.S. PATENT DOCUMENTS

| | | | | |
|---|---|---|---|---|
| 5,624,266 A * | 4/1997 | Gibbs | ..................... | B60Q 1/302 224/315 |
| 9,773,601 B2 * | 9/2017 | Breiwa | ..................... | H02J 50/10 |
| 9,819,850 B2 * | 11/2017 | Taran Katz | ............ | H01R 25/00 |
| 2003/0140956 A1 * | 7/2003 | Fargason | ............... | A01M 31/00 114/351 |
| 2017/0215979 A1 * | 8/2017 | Childs | ..................... | A61B 50/26 |
| 2017/0318888 A1 * | 11/2017 | Staudinger | ............. | A42B 3/288 |
| 2019/0310692 A1 * | 10/2019 | Lavy | .................... | H01R 31/065 |

FOREIGN PATENT DOCUMENTS

| | | |
|---|---|---|
| CN | 207389090 U | 5/2018 |
| TW | M543952 U | 6/2017 |
| TW | M563372 U | 7/2018 |

* cited by examiner

*Primary Examiner* — Clayton E. LaBalle
*Assistant Examiner* — Warren K Fenwick
(74) *Attorney, Agent, or Firm* — Lerner, David, Littenberg, Krumholz & Mentlik, LLP (57) ABSTRACT

Disclosed is a coupling system for coupling an accessory to a mount. Included is a mount comprising a mount end for mounting on a mounting surface and a coupling end comprising a first coupling arrangement, and an accessory coupleable to mount. The accessory comprising a second coupling arrangement disposed on a surface. The first and second coupling arrangement comprising coupling elements configured to guide accessory into a coupling orientation relative to mount maintain coupling orientation through a coupling/decoupling operation and to couple accessory to mount in a coupled configuration. First set of coupling elements comprise formations disposed on one of first and second coupling arrangements and complementary formations disposed on the other of first and second coupling arrangements. The formations receivable by and abuttable with complementary formations in a non-retaining arrangement to maintain coupling orientation through coupling/ decoupling operation and to inhibit rotational movement of mount relative to accessory.

25 Claims, 5 Drawing Sheets

COUPLING SYSTEM

CROSS REFERENCE TO RELATED APPLICATIONS

The present application claims priority from U.K. Patent Application No. GB 1900214.6 filed on Jan. 7, 2019, all of which are hereby incorporated herein by reference.

TECHNICAL FIELD

The present invention relates to a coupling system for coupling an accessory to a mount. In particular, but not exclusively, the present invention relates to a coupling system for coupling a camera to a mount in a vehicle.

BACKGROUND

Camera systems for vehicles such as, for example, on-board camera systems, dashboard cameras, in-vehicle systems, etc. are increasing in use and popularity. Such camera systems are sometimes referred to as "Dash Cams" because they are often mounted to a vehicle dashboard. They are often installed into a vehicle after the overall vehicle has been manufactured, as an "after-sales" modification or personalisation of the vehicle by a user and are employed as a means to capture images of an area in and/or around a vehicle. Images captured by such systems may be used as evidence in the case of an accident, damage, or the like. Often, such camera systems are configured to continuously record video footage of a view through a windscreen of a vehicle in which they are mounted. Such camera systems may be attached to the interior of the vehicle windscreen or to the top of the dashboard of the vehicle.

Some known camera systems are operative to capture an image, a sequence of images, and/or record video footage when the vehicle is started, responsive to a user input, and/or automatically responsive to detection of movement of the vehicle.

Typically, a camera is mounted to the superstructure of the vehicle or window by way of an adhesive or suction attachment coupled to the camera through an arm so that the camera field of view is not obstructed by the adhesive or suction attachment or superstructure of the vehicle. Optionally, the arm may be movably attached to one other or both of the attachment or camera. Such movable attachment may be by way of a ball and socket joint in which the ball may be tightened around the socket by way of a screw thread and nut arrangement or some other mechanism may be utilised for maintaining the orientation of the arm once it has been moved to a desired position.

As such camera systems become more sophisticated in terms of their functionality, they become more expensive and may, potentially, be a target for thieves if they are left in-situ in a vehicle on a permanent basis since, by their very nature, they are located in a highly visible position within the vehicle.

Whilst a camera that is detachable from a mount assembly may be desirable, so that the camera can be removed from the vehicle, introducing detattachment functionality to such a camera system may weaken the robustness of the means by which the camera is mounted to the vehicle. If the strength of the bond between camera and vehicle, via mount assembly, is insufficient, then during an event in which the vehicle should experience a severe change in speed, for example such as may occur in the event of the vehicle crashing into something, the force experienced by the camera may be such as to cause the camera to be detached from the mount assembly. This may potentially cause the camera to fly through the interior of the vehicle possibly causing injury to one or more vehicle occupants and/or damage to the vehicle itself.

The present invention has been devised with the foregoing in mind.

SUMMARY

According to an aspect of the present invention, there is provided a coupling system for coupling an accessory to a mount, the system comprising: a mount comprising a mount end for mounting on a mounting surface and a coupling end comprising a first coupling arrangement; an accessory coupleable to the mount, the accessory comprising a second coupling arrangement disposed on a surface thereof; the first coupling arrangement and second coupling arrangement comprising a plurality of coupling elements configured to guide the accessory into an coupling orientation relative to said mount, to maintain said coupling orientation through a coupling/decoupling operation and to couple said accessory to said mount in a coupled configuration; wherein a first set of said plurality of coupling elements of said first and second coupling arrangements comprise formations disposed on one of said first and second coupling arrangements and complementary formations disposed on the other of said first and second coupling arrangements, the formations receivable by and abuttable with the complementary formations in a non-retaining arrangement to maintain said coupling orientation through a coupling/decoupling operation and to inhibit rotational movement of said mount relative to said accessory.

The second coupling arrangement is removably engageable with the first coupling arrangement of the mount when the two said coupling arrangements are moved toward, or away from, each other in a coupling/decoupling orientation in a linear direction. During use, i.e. when the first and second coupling arrangements are in a coupled configuration, to couple the accessory to the mount, the accessory may be subject to forces in a direction that may cause rotation of the accessory relative to the mount. These forces effectively cause the accessory to try to "peel" away from the mount in a rotatable manner. However, the interaction of the first set of said plurality of coupling elements of both said first and second coupling may reduce, inhibit and/or avoid rotational movement of the accessory relative to the mount so that such a "peeling" separation effect is inhibited, or avoided. Due to this, rotational movement of the accessory relative to the mount may be inhibited, or limited, such that the accessory may only be removable from the mount in a single axis that is tangential to opposed surfaces of the first and second coupling arrangements respectively. For example, when in a coupled configuration with the mount the accessory can only be removed when pulled directly backward from the mount. This may be useful where the mount is used in a vehicle to mount the accessory to a surface of the vehicle (e.g. to the interior of a vehicle windscreen), where restriction of the decoupling operation to a single axis may decrease the chance that the accessory will be separated from the mount in the event of a crash, or when experiencing jolts during movement of a vehicle in which the accessory and mount are located.

Optionally, said formations and complementary formations may be configured to restrict relative movement of said mount and said accessory during a coupling/decoupling operation to a direction transverse to opposing surfaces of said first and second coupling arrangements.

Optionally, said formations of said first coupling arrangement comprise a plurality of lugs and said complementary formations of said second coupling arrangement comprise a plurality of apertures, each one of said plurality of apertures configured to receive a corresponding one of said plurality of lugs. The lugs are receivable in said apertures for abutment with internal surfaces of the aperture.

Optionally, a second set of said plurality of coupling elements comprise guide surfaces of said first and second coupling arrangements, said guide surfaces of said first coupling arrangement being complementary to said guide surfaces of said second coupling arrangement, the respective complementary surfaces configured to maintain said coupling orientation through a coupling/decoupling orientation.

Such guide surfaces may serve to guide the accessory into a coupling configuration with the mount during a coupling operation.

Optionally, said first coupling arrangement comprises a planar element comprising a front surface, a rear surface and side walls connecting said front and rear surfaces, with said side walls forming said guide surfaces of said first coupling arrangement, and further wherein said second coupling arrangement comprises a recess in said accessory, said recess being of a complementary shape to said planar element with side walls of said recess forming said guide surfaces of said second coupling arrangement.

Optionally, said plurality of lugs comprises four lugs, comprising first, second, third and fourth lugs extending out of a plane of said front surface respectively from a first edge of said front surface, a second edge of said front surface, a third edge of said front surface, and a fourth edge of said front surface, and further wherein said plurality of aperture comprises four apertures, comprising first, second, third and fourth apertures disposed in a bottom surface of said recess located at edges of said recess formed between said bottom surface and respective first, second, third and fourth side walls of said recess.

Optionally, a circumference of said front surface is smaller than a circumference of said rear surface and said side walls are slanted between said front and rear surfaces such that said planar element forms a truncated pyramid.

Optionally, said recess is of a truncated pyramidal shape complementary to that of the planar element.

Optionally, a third set of said plurality of coupling elements comprise magnetic elements disposed on said first and second coupling arrangements, said magnetic elements arranged to attract said first coupling arrangement to said second coupling arrangement, and vice versa, to maintain said coupling orientation through said coupling/decoupling operation and to couple said accessory to said mount in said coupled configuration.

Use of magnets in both the first and second coupling arrangements may serve to provide a self-locating functionality during a coupling operation, and also serve to releasably mechanically couple the first coupling arrangement to the second coupling arrangement with a relatively strong coupling force.

Optionally, a first magnetic element of said magnetic elements is disposed in a front surface of said planar element and a second magnetic element of said magnetic elements is disposed in a bottom surface of said recess, said front surface of said planar element and said bottom surface of said recess facing one another when said accessory and said mount are in said coupling/decoupling orientation.

Optionally, said magnetic elements may comprise permanent magnets.

Optionally, said magnetic elements comprise rare-earth magnets.

Optionally, said rare-earth magnets comprise neodymium.

Optionally, a surface of said second magnetic element forms a portion of said bottom surface of said recess.

Optionally, a portion of a remaining portion of said bottom surface is configured to space said second magnetic element from said plurality of apertures. Spacing the second magnetic element from the plurality of apertures may avoid damage to relatively fragile magnets due to contact between the magnets and formations entering and leaving the apertures.

Optionally the coupling system may further comprise a first electro-mechanical coupling element disposed on said coupling end of said mount and forming part of said first coupling arrangement, and a second electro-mechanical coupling element, complementary to said first electro-mechanical coupling element, forming part of said second coupling arrangement.

Optionally, the first electro-mechanical coupling element is located on said front surface of said planar element and said second electro-mechanical coupling element is located in said bottom surface of said recess.

Optionally, said first electro-mechanical coupling element comprises a plurality of pins and said second electro-mechanical coupling element comprises a corresponding plurality of receivers for receiving said pins.

Optionally, said first electro-mechanical coupling element comprises a plurality of blades and said second electro-mechanical coupling element comprises a corresponding plurality of pairs of blades defining spaces between each pair for receiving a corresponding one of said plurality of blades of said first electro-mechanical coupling element.

Optionally, said mount comprises a mount for location in a vehicle.

Optionally, said mount is configured for said mount end to be receivable in a mount base unit, the mount base unit locatable against a vehicle surface.

Optionally, said accessory comprises a camera for recording video footage of an exterior and/or interior of the vehicle.

Optionally, said first coupling arrangement comprises a first orientation formation and said second coupling arrangement comprises a second orientation formation complementary to the first orientation formation, said first orientation formation and second orientation formation defining a coupling orientation of said accessory relative to said mount.

According to another aspect of the present invention, there is provided an accessory for a coupling system as described above and hereinafter, the accessory comprising an accessory as described above and hereinafter.

According to another aspect of the present invention, there is provided a mount for a coupling system as described above and hereinafter, the mount comprising a mount as described above and hereinafter.

BRIEF DESCRIPTION OF THE DRAWINGS

One or more embodiments of the present invention are described further hereinafter, by way of example only, with reference to the accompanying drawings in which.

DETAILED DESCRIPTION OF THE INVENTION

Figure 1:
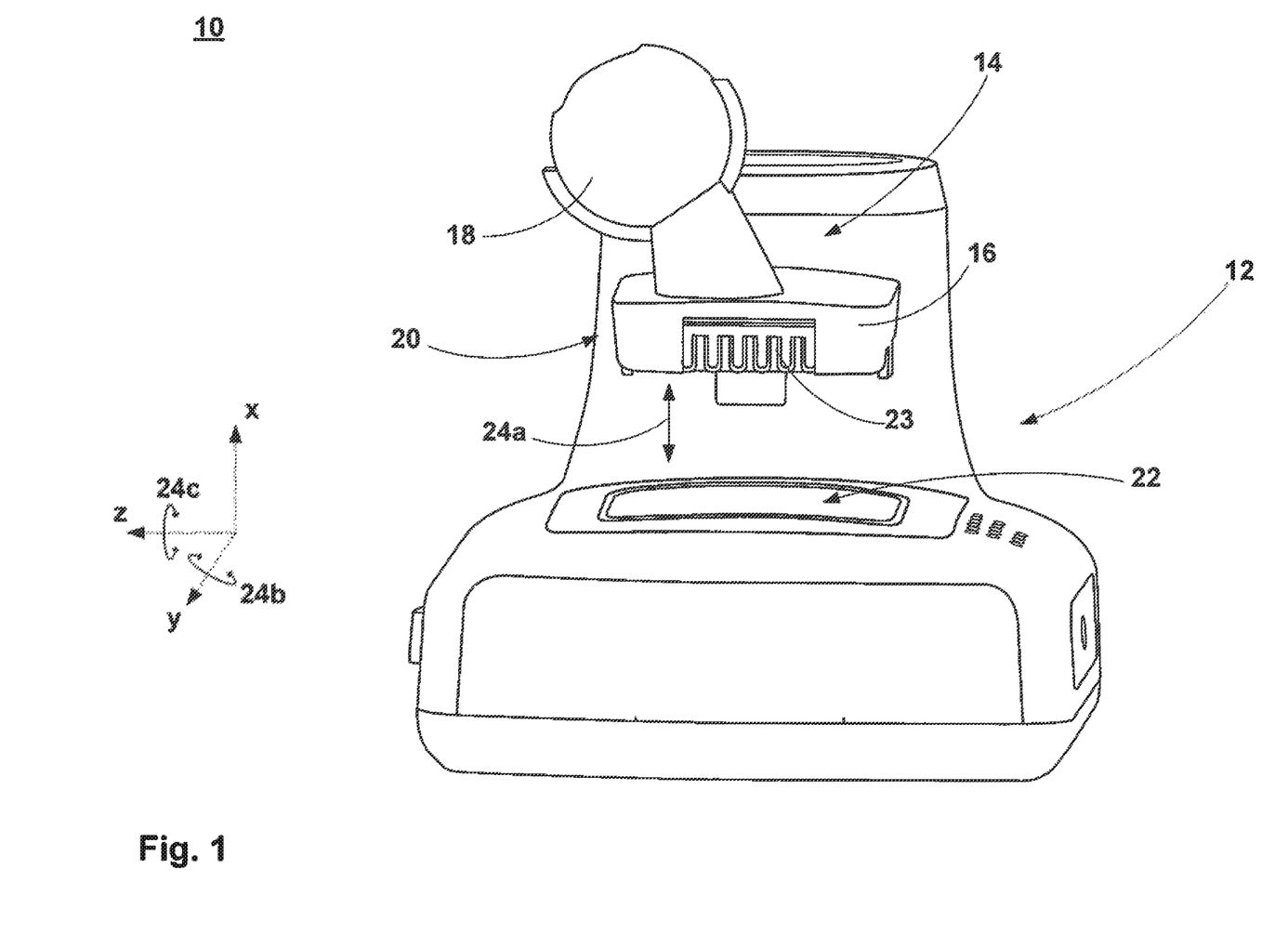
FIG. 1 schematically illustrates an isometric projection of a coupling system in accordance with one or more embodiments of the present invention with an accessory of the coupling system and a mount of the coupling system in a decoupled configuration.

FIG. 1 shows an isometric projection of a coupling system 10 according to one or more embodiments of the present invention. The coupling system 10 comprises an accessory 12 and a mount 14. In FIG. 1, the accessory 12 and mount 14 are shown in a decoupled configuration.

In one or more embodiments, the coupling system 10 may be used to removably couple an accessory to a surface of a vehicle in which it is situated. For example, a dashcam; GPS device; satellite navigation system; and the like may be removably coupled to a windscreen; rear windscreen; or side door window of a vehicle.

The accessory 12 and mount 14 of the coupling system 10 are removably coupleable to one other. The mount 14 comprises a coupling end 16 and a mounting end 18. The coupling end 16 of the mount 16 is configured for removable coupling of the mount 14 to the accessory 12. The mounting end 18 of mount 14 is configured for receipt in a mount base unit (not shown). The mount base unit is configured for location against a surface, e.g. a surface forming part of the vehicle superstructure, or a vehicle dashboard, or a vehicle window.

The coupling end 16 of the mount 14 includes a first coupling arrangement 20 and a first electro-mechanical coupling element 23. In the illustrated example, the mounting end 18 of the mount 14 comprises a ball formation for connection to a complimentary ball socket in the mount base unit. However, in optional arrangements, the mounting end 18 may be configured for mounting directly to a mounting surface. The accessory 12 comprises a second coupling arrangement 22 for coupling with the first coupling arrangement 20 of the mount 14. The second coupling arrangement 22 is removably engageable with the first coupling arrangement 20 of the mount 14 when the two said coupling arrangements are moved toward, or away from, each other in a coupling/decoupling orientation in a linear direction— indicated by arrow 24a in FIG. 1, which corresponds to movement along a direction corresponding to an x-axis of the defined x,y,z axis defined in the figure.

Figure 2:
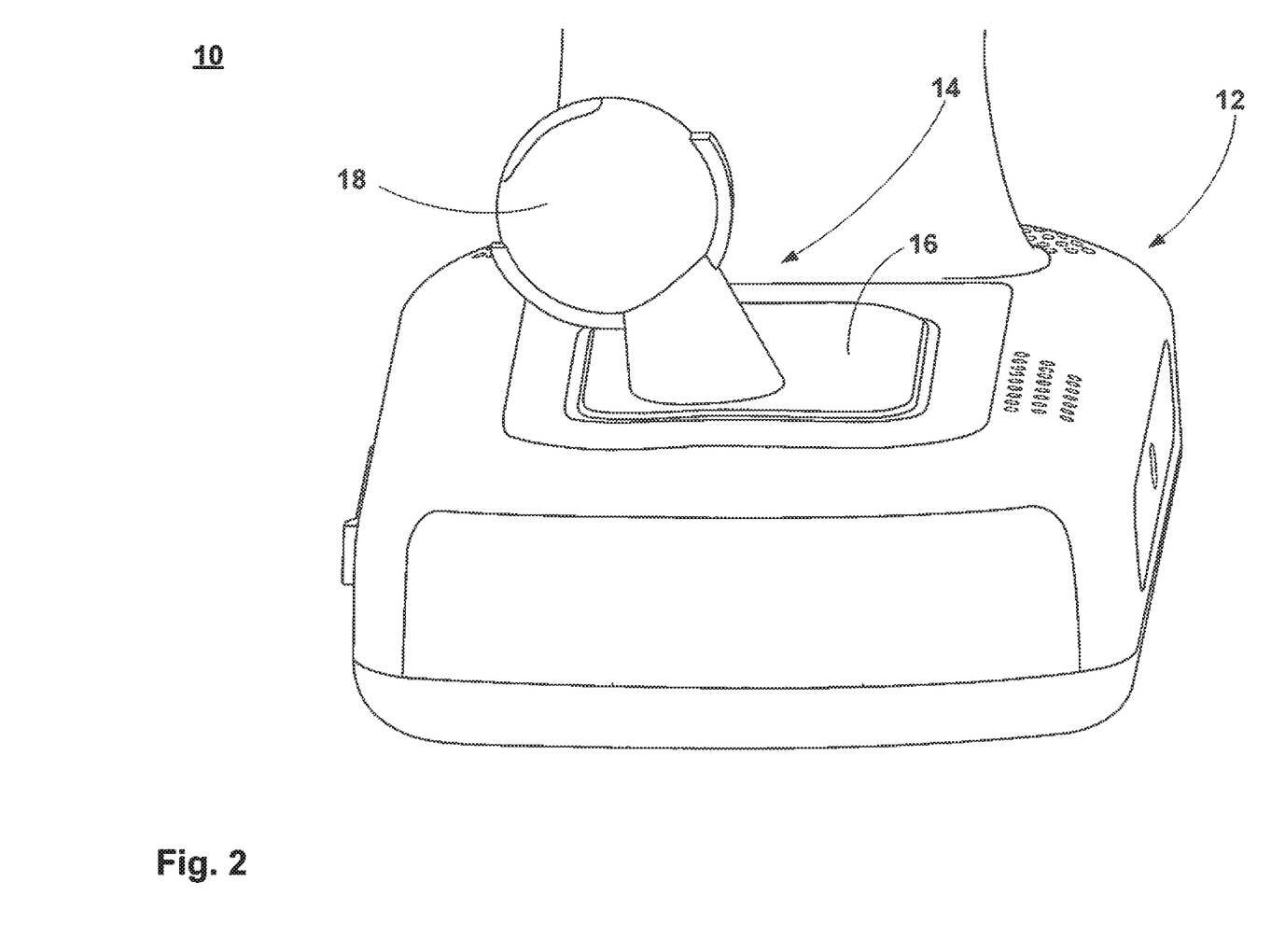
FIG. 2 schematically illustrates an isometric projection of the coupling system with the accessory and mount in a coupled configuration.

FIG. 2 shows an isometric projection of the coupling system 10 with the accessory 12 and mount 14 in a coupled configuration. Following movement in the linear direction 24 of the mount 14 toward the accessory 12 from the decoupled configuration illustrated in FIG. 1, the first and second coupling arrangements 20 and 22 are brought into engagement with each other to the coupling configuration as illustrated in FIG. 2. In this manner, the accessory 12 is coupled to the mount 14 through coupling of the first coupling arrangement 20 to the second coupling arrangement 22.

Figure 3:
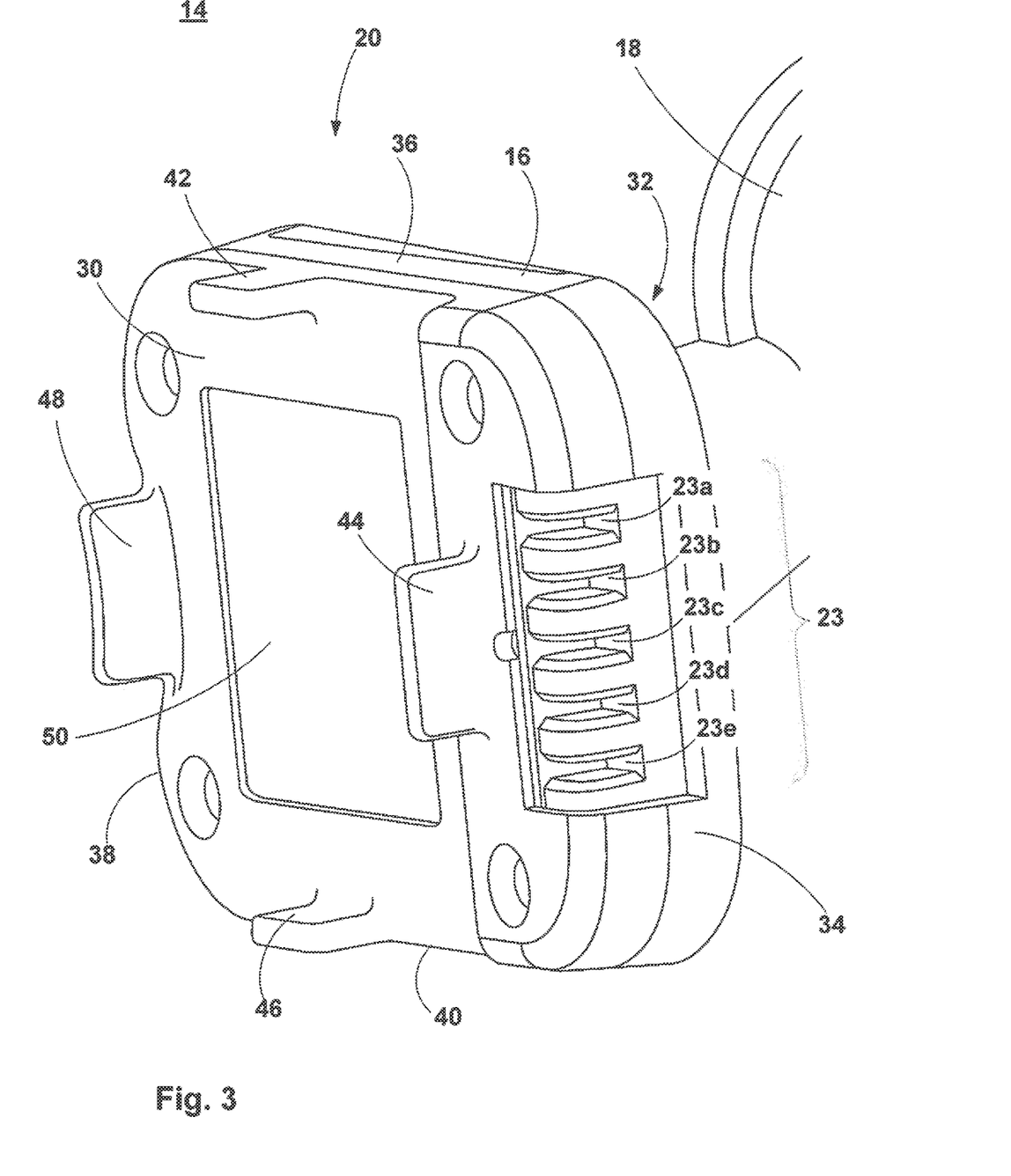
FIG. 3 schematically illustrates an isometric projection of a first coupling arrangement of the coupling system, which is located on the mount.

FIG. 3 shows an isometric projection of the first coupling arrangement 20 of the mount 14. The first coupling arrangement 20 is disposed at the coupling end 16 of the mount 14 and comprises a planar element that comprises a front surface 30, rear surface 32 and sidewalls 34, 36, 38, and 40 extending between said front surface 30 and rear surface 32 so as to connect them. In the illustrated example, the circumference, or perimeter, of the front surface 30 is not equivalent to the circumference, or perimeter, of the rear surface 32. The sidewalls 34, 36, 38, and 40 that connect the said first and second surfaces 30, 32 are slanted therebetween. In the illustrate example, the circumference of the rear surface 32 is larger than the circumference of the front surface 30 and the sidewalls 34, 36, 38, and 40 are tapered towards the front surface 30 such that the planar element forming part of the first coupling arrangement 20 forms a truncated pyramid. Other 3-D shapes may be imagined, for example, a truncated conical shape and the like.

The sidewalls 34, 36, 38, and 40 form first, second, third, and fourth guiding surfaces that, in combination form, one coupling element of the first coupling arrangement 20. The coupling element formed from the first to fourth guiding surfaces 34, 36, 38, and 40 is arranged such that it acts as a guide to guide the first coupling arrangement 20 into the second coupling arrangement 22 of accessory 12 during a coupling/decoupling operation. This will be described in more detail hereinafter.

The first electro-mechanical coupling element 23 comprises a plurality of recesses 23a-e via which an electrical and mechanical connection can be made with complementary formations (not shown) in the second coupling arrangement 22. In the illustrated example, there are five recesses 23a-e with a series of female blade connectors formed on the sidewalls of said recesses. The female blade connectors are configured to receive complimentary formations forming a second electro-mechanical coupling element (not shown) of the second coupling arrangement 22.

In the illustrated example, the first electro-mechanical coupling element 23 is configured to form part of the fourth guiding surface 34 and front surface 30 of the first coupling arrangement 20. However, it will be appreciated that the first electro-mechanical coupling element 23 does not necessarily need to form part of the fourth guiding surface 34, nor part of the front surface 30. It may be located elsewhere in one or more other embodiments and/or it may be recessed back from a guiding service or from front surface 30.

To continue the description of the mount 14, a further coupling element of the first coupling arrangement 20 comprises a plurality of formations extending from the front surface 30 of the planar element forming part of the mount 14. In the illustrated example, the plurality of formations comprise four lugs 42, 44, 46 and 48. The lugs 42-48 are configured for receipt by complementary formations (not shown) forming part of the second coupling arrangement 22. The lugs 42-48 are configured to act, in combination with the complementary formations of the second coupling arrangement 22, to guide the first coupling arrangement 20 relative to the second coupling arrangement 24 during a coupling/decoupling operation and, when partially, or fully located within the complementary formations, to abut surfaces of the complementary formations to inhibit rotational movement of the first coupling arrangement 20 relative to the second coupling arrangement 22. The interaction of the lugs 42-44 with the complementary formations of the second coupling arrangement 22 can serve to maintain a coupling orientation of the accessory 14 and mount 12 through a coupling/decoupling operation.

During use, i.e. when the first and second coupling arrangements are a coupled configuration and the lugs 42-48 are received in the corresponding complementary formations of the second coupling arrangement 22, the accessory 12 may be subject to forces in a direction that may cause rotation of the accessory 12 relative to the mount 14—as indicated by arrows 24b, 24c in FIG. 1. These forces effectively cause the accessory 12 to try to "peel" away from the mount 14 in a rotatable manner. However, the interaction of the lugs 42-48 with the complementary formations of the second coupling arrangement 22 in which they are received reduces, inhibits and/or avoids rotational movement of the accessory 12 relative to the mount 14 so that such a "peeling" separation effect is inhibited, or avoided. The interaction of the lugs 42-48 with the complementary formations of the second coupling arrangement 22, when partially, or fully located within the complementary formations, may ensure that the front surface 30 remains opposed to a bottom surface of the recess of the second coupling arrangement (described in detail with relation to FIG. 4). This interaction may permit movement of the accessory 12 relative to the mount 14 during a coupling/decoupling operation that is substantially linear only, i.e. substantially tangential to the plane of the front surface of the first coupling arrangement 20 and to the opposing plane of the bottom surface of the second coupling arrangement 22.

In the illustrated example, the plurality of formations are shown as, and have been described as, lugs 42-48, but in one or more other embodiments, they may comprise pins, or other formations having different shapes/configurations.

The lugs 42-48 extend out of a plane of the front surface 30 respectively from, or from portions of the front surface 30 adjacent to, a first edge of the front surface 30, a second edge of the front surface 30, a third edge of the front surface 30, and a fourth edge of the front surface 30. In the illustrated example, they extend substantially tangential to the plane of the front surface 30 and are not parallel to the taper of the first, second, third, and fourth sidewalls 34, 36, 38, and 40.

A further coupling element of the first coupling arrangement 20 of mount 14 comprises a magnetic element, which, in one or more embodiments, may comprise a permanent magnet. Optionally, the permanent magnet comprises a rare-earth material, such as neodymium. In the illustrated example, the magnetic element comprises neodymium magnet 50, which is disposed on the front surface 30 of the first coupling arrangement 20. Optionally, and in order to reduce the likelihood that the magnet may lose its magnetism over time, a magnetic element with a high Curie point may be preferable. The neodymium magnet 50 may be disposed in a recess in the front surface 30 so as to reduce the likelihood of the relatively brittle material of the magnet shattering, due to, for example, contact of surfaces of the magnet 50 with any other surfaces. When disposed in such a recess, only one surface of the magnet is exposed (see FIG. 3) and other surfaces thereof are protected by surrounding material of the front surface 30.

To minimise and reduce the forces acting on the magnet 50 during coupling and decoupling of the accessory 12 and mount 14, the size and position of the recess in which the magnet is located is spaced from the regions where the lugs 42-48 are located to distance the magnet from points of mechanical interaction between the first coupling arrangement 20 and second coupling arrangement 22. In this way, any lateral or rotatational forces applied in a direction along and in the plane of the front surface 30 during coupling/decoupling of the accessory 12 and mount 14 may be absorbed by material of the front surface 30 surrounding the recess.

In addition to being tapered between the rear surface 32 and the front surface 30, the third sidewall 38 comprises a concave region that curves inwardly in a direction toward the second sidewall 32. This, in combination with a complementary feature (not shown) of the second coupling arrangement 22, acts as a means to prevent the accessory 12 from coupling to the mount 14 in the wrong way, i.e. the connection between the mount and accessory is one way and the combination of the curved sidewall 38 and complementary feature of the second coupling arrangement 22 acts as an orientational guide during a coupling operation.

Figure 4:
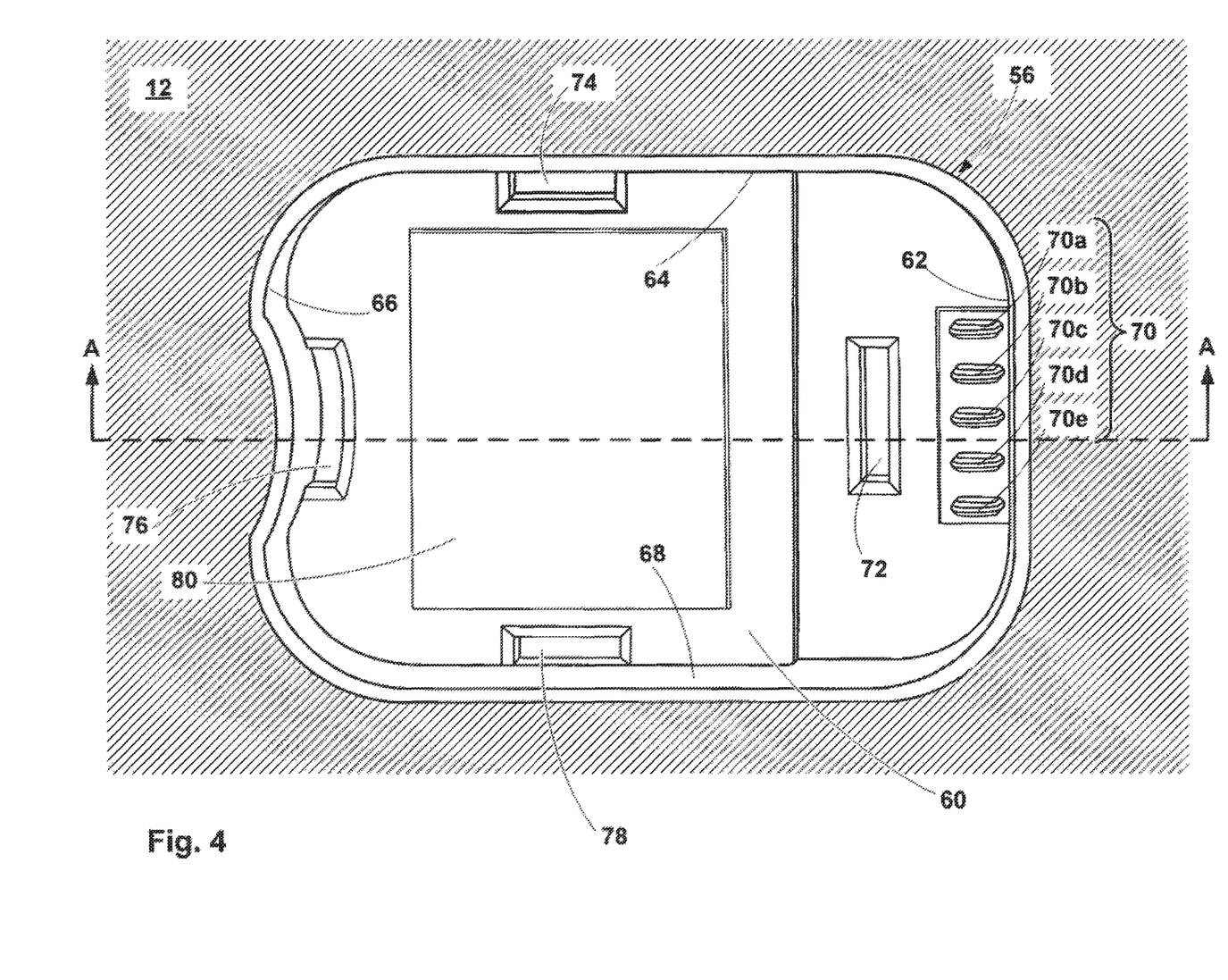
FIG. 4 schematically illustrates an isometric projection of a second coupling arrangement of the coupling system, which is located on the accessory.

FIG. 4 shows an isometric projection of the second coupling arrangement 22 of the accessory 12. The second coupling arrangement 22 comprises a recess 56 in accessory 12 and is of a complementary shape to the previously described first coupling arrangement 20. The recess 56 is formed in a surface of the accessory and comprises a bottom surface 60 and sidewalls 62, 64, 66 and 68 extending laterally from said bottom surface 60. In the illustrated example, the circumference, or perimeter, of the mouth of the recess 56 is not equivalent to the circumference, or perimeter, of the bottom surface 60. The sidewalls 62-68 that connect edges of the bottom surface 60 to edges of the mouth of the recess 56 are slanted therebetween. In the illustrated example, the circumference of the mouth of the recess 56 is larger than the circumference of the bottom surface 60 and the sidewalls 62-68 are tapered outwardly from the bottom surface 60 towards the mouth such that the recess 56 forming part of the second coupling arrangement 22 forms a truncated pyramid that complements that of the first coupling arrangement 20 of mount 14. Other 3-D shapes may be imagined, for example, a truncated conical shape and the like.

The shape and tapers of the sidewalls of the first and second coupling arrangements form a further coupling element for guiding the accessory 12 and mount 14 during a coupling/decoupling operation.

The bottom surface 60 of recess 56 forming part of the second coupling arrangement 22 comprises a second electro-mechanical coupling element 70. The second electro-mechanical element 70 comprises a plurality blades 70a-e which are complementary in form to the recesses 23a-e of the first electro-mechanical coupling element 23 of the first coupling arrangement 20. The blades 70a-e comprise an electrically conducting material and are configured to electro-mechanically couple the accessory 12 and the mount 14 when in a coupled configuration. In the illustrated example, there are five blades 70a-e that extend from the bottom surface 60. Using blades as electro-mechanical connection elements increases the surface area of the electrical contact between the blades 70a-e and the corresponding elements of the first electro-mechanical coupling element 23. Moreover, due to the shape of the blades the force upon the first electrical-mechanical coupling element 70 is applied vertically during coupling between the mount 14 and accessory 12. It will be appreciated that the number of blades 70a-e and complimentary recesses of the first coupling arrangement 20 can vary in number based on the requirements of the accessory. In the illustrated example, the number of blades and complementary recesses is such that power and data can be transferred and a ground is provided.

The second coupling arrangement 22 further comprises another coupling element comprising formations that are complementary in form to the formations of the first coupling arrangement 20. In the illustrated example, the plurality of formations comprise four apertures, comprising first, second, third and fourth apertures 72-78 disposed in the bottom surface 60 of the recess 56. Each one of the four apertures 72-78 is configured to receive a respective one of the four lugs 42-48 of the first coupling arrangement 20. The apertures 72-78 extend into material forming the bottom surface 60 respectively from a first edge of the bottom surface 60, a second edge of the bottom surface 60, a third edge of the bottom surface 60, and a fourth edge of the bottom surface 60. They extend substantially tangential into the material of the bottom surface 60 from the plane of the bottom surface 60 and not in a direction parallel with the taper of the first, second, third, and fourth sidewalls 62,-68.

The four apertures 72-78 are configured to receive the lugs 42-48 of the first coupling arrangement of the mount 14. The apertures 72-78 are configured to act, in combination with the lugs 42-48 of the first coupling arrangement 20, to guide the first coupling arrangement 20 relative to the second coupling arrangement 24 during a coupling/decoupling operation and, when the lugs 42-48 are partially, or fully located within the respective apertures 72-78, to abut surfaces of the lugs with surfaces of the apertures to inhibit rotational movement of the first coupling arrangement 20 relative to the second coupling arrangement 22. The interaction of the lugs 42-44 with the apertures 72-78 of the second coupling arrangement 22 can serve to maintain a coupling orientation of the accessory 14 and mount 12 through a coupling/decoupling operation.

A further coupling element of the second coupling arrangement 22 of accessory 12 is comprises a magnetic element, which, in one or more embodiments, may comprise a permanent magnet. Optionally, the permanent magnet comprises a non-ferrous material, for example a rare-earth material, such as neodymium. In the illustrated example, the magnetic element comprises neodymium magnet 80, which is disposed on the bottom surface 60 of the second coupling arrangement 22. Optionally, and in order to reduce the likelihood that the magnet may lose its magnetism over time, a magnetic element with a high Curie point may be preferable. The neodymium magnet 80 may be disposed in a recess in the bottom surface 60 so as to reduce the likelihood of the relatively brittle material of the magnet shattering, due to, for example, contact of surfaces of the magnet 80 with any other surfaces. When disposed in such a recess, only one surface of the magnet is exposed (see FIG. 4) and other surfaces thereof are protected by surrounding material of the bottom surface 60.

Similar to the first coupling arrangement 20, to minimise and reduce the forces acting on the magnet 80 during coupling and decoupling of the accessory 12 and mount 14, the size and position of the recess in which the magnet is located is spaced from the regions where the apertures 72-78 are located to distance the magnet from points of mechanical interaction between the first coupling arrangement 20 and second coupling arrangement 22. In this way, any lateral or rotational forces applied in a direction along and in the plane of the front bottom surface 60 during coupling/decoupling of the accessory 12 and mount 14 may be absorbed by material of the bottom surface 60 surrounding the recess.

In addition to being tapered between the mouth and the bottom surface 60 the third sidewall 66 of recess 56 comprises a convex region that curves inwardly in a direction toward the second sidewall 62. This, in combination with the complementary feature of the first coupling arrangement 22 (i.e. concave third sidewall 38), acts as a means to prevent the accessory 12 from coupling to the mount 14 in the wrong way, i.e. the connection between the mount and accessory is one way and the combination of the curved sidewall 38 of the first coupling arrangement 20 and convex sidewall 66 of the recess 56 of the second coupling arrangement 22 acts as an orientational guide during a coupling operation. This, as described above, may prevent the accessory 12 being mounted incorrectly to mount 14 and may protect the blades 70a-e of the second electro-mechanical coupling element from being damaged due to incorrect orientation of accessory relative to mount during a coupling operation.

Figure 5:
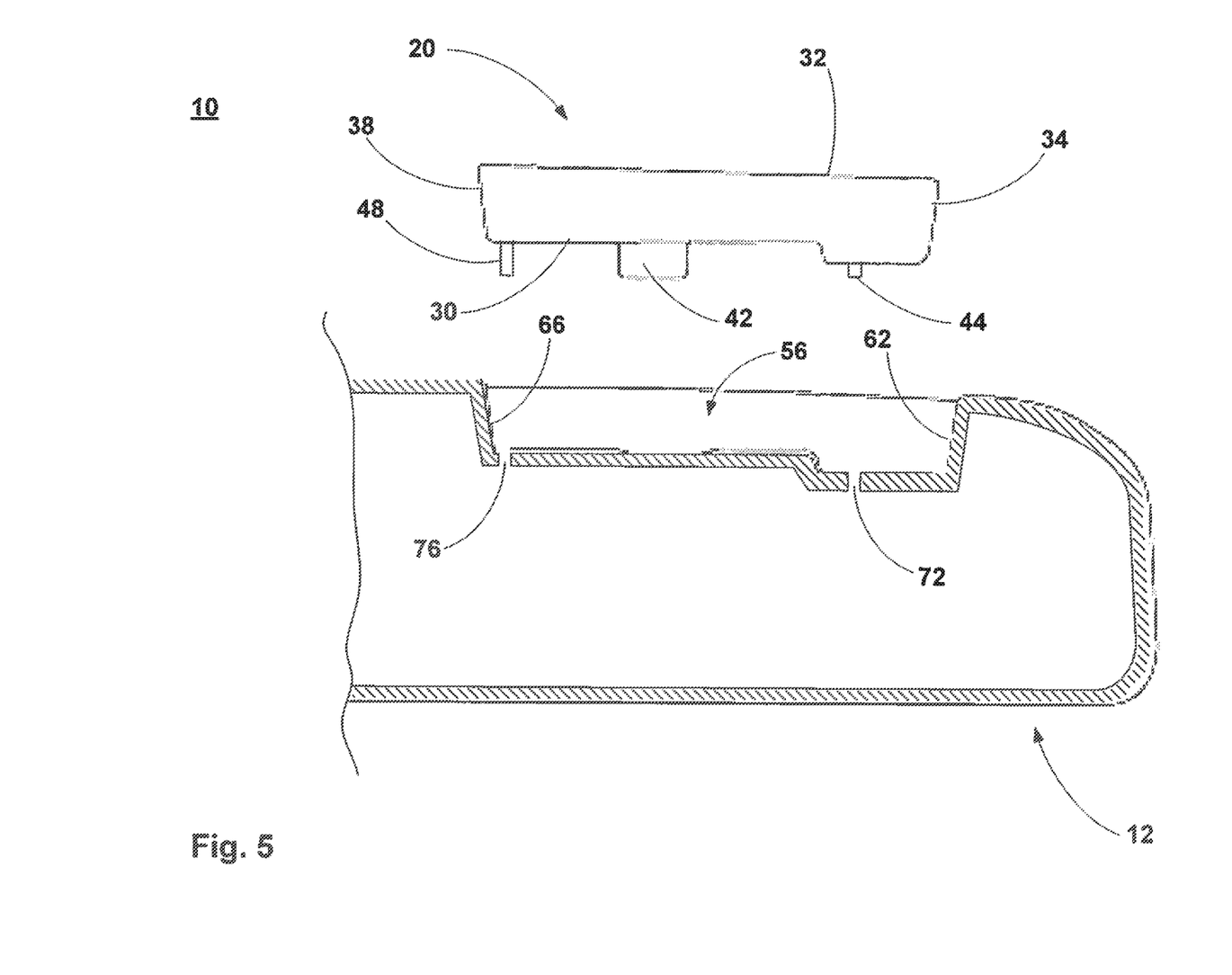
FIG. 5 schematically illustrates a cross-sectional side view of the coupling system with the mount and accessory in a decoupled configuration.

FIG. 5 is an illustrative example of a cutaway cross-sectional view of the first coupling arrangement 20 and the second coupling arrangement 22 of said mount 14 and accessory 12 respectively in a decoupled configuration when viewed in a direction indicated by arrows along the line A-A of FIG. 4.

In the cross-sectional view it can be seen that the first coupling arrangement 20 comprises the tapered guiding surfaces 34 and 38 extending between the rear surface 32 and front surface 30. From this cross-sectional view it can be seen that the aforementioned tapered guiding surfaces 34 and 38 of the first coupling arrangement 20 correspond in a complementary manner to the tapered guiding surfaces 62 and 66 of the second coupling arrangement 22 respectively.

Moreover, it will be seen that the shape of the planar element of the first coupling arrangement 20 matches the shape of the recess 56 of the second coupling arrangement 22. The tapered nature of the guide surfaces, in combination with the magnetic elements of the respective first and second couplings, may act as a self-locating mechanism to draw the accessory toward the mount during a coupling operation and to guide the accessory toward a correct coupling configuration with the mount.

When the accessory 12 is coupled to the mount 14, the apertures 72, 74, 76, and 78 of the second coupling arrangement 22 receive the lugs, 42, 44, 46 and 48 of the first coupling arrangement 20. Due to this, rotational movement of the accessory 12 relative to the mount 14 may be inhibited, or limited, such that the accessory 12 may only be removable from the mount 14 in a single axis that is tangential to the front surface 30 and bottom surface 60 of the first and second coupling arrangements respectively, i.e. when in a coupled configuration with the mount the accessory 12 can only be removed when pulled directly backward from the mount 14. This restriction of the decoupling operation to a single axis may decrease the chance that the accessory 12 will be separated from the mount 14 in the event of a crash, or when experiencing jolts during movement of a vehicle in which the accessory and mount are located.

In the above-described one or more embodiments, the mount 14 may be manufactured using many materials such as plastics, ferrous and non-ferrous metals, plastic coated metals and any combination thereof.

Any references made herein to orientation (e.g. top, bottom, upper, lower, front, back, and rear) are made for the purposes of describing relative spatial arrangements of the features of the apparatus, and are not intended to be limiting in any sense.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the terms "a" or "an" are employed to describe elements and components of the invention. This is done merely for convenience and to give a general sense of the invention. This description should be read to include one or at least one and the singular also includes the plural unless it is obvious that it is means otherwise.

In view of the foregoing description it will be evident to a person skilled in the art that various modifications may be made within the scope of the invention. For example, embodiments in accordance with the invention are not limited to any of the particular materials disclosed herein. Other materials suitable for performing the function described herein for a particular material may also be utilized in embodiments of the invention.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A coupling system for coupling an accessory to a mount, the system comprising:
a mount comprising a mount end for mounting on a mounting surface and a coupling end comprising a first coupling arrangement;
an accessory connectable to the mount, the accessory comprising a second coupling arrangement disposed on a surface thereof;
the first coupling arrangement and the second coupling arrangement comprising a plurality of coupling elements configured to guide the accessory into an coupling orientation relative to said mount, to maintain said coupling orientation through a coupling/decoupling operation and to couple said accessory to said mount in a coupled configuration; and
wherein a first set of said plurality of coupling elements of the first and the second coupling arrangements comprise a formations disposed on one of the first and the second coupling arrangements and a complementary formations disposed on the other of the first and the second coupling arrangements, the formations receivable by and abuttable with the complementary formations in a non-retaining arrangement to maintain said coupling orientation through the coupling/decoupling operation and to inhibit a rotational movement of said mount relative to said accessory about all axes.

2. A coupling system according to claim 1, wherein the formations and the complementary formations are configured to restrict relative movement of said mount and said accessory during ft the coupling/decoupling operation to a direction transverse to an opposing surfaces of the first and the second coupling arrangements.

3. A coupling system according to claim 1, wherein the formations of the first coupling arrangement comprise a plurality of lugs and the complementary formations of the second coupling arrangement comprise a plurality of apertures, each one of said plurality of apertures configured to receive a corresponding one of said plurality of lugs.

4. A coupling system according to claim 1, wherein a second set of said plurality of coupling elements comprise a guide surfaces of the first and the second coupling arrangements, said guide surfaces of the first coupling arrangement being complementary to said guide surfaces of the second coupling arrangement, a respective complementary surfaces configured to maintain said coupling orientation through the coupling/decoupling orientation.

5. A coupling system according to claim 4, wherein the first coupling arrangement comprises a planar element comprising a front surface, a rear surface and a side walls connecting said front and rear surfaces, with said side walls forming said guide surfaces of the first coupling arrangement, and further wherein the second coupling arrangement comprises a recess in said accessory, said recess being of a complementary shape to said planar element with the side walls of said recess forming said guide surfaces of the second coupling arrangement.

6. A coupling system according to claim 5, wherein a plurality of lugs comprises four lugs, comprising a first, a second, a third and a fourth lugs extending out of a plane of said front surface respectively from a first edge of said front surface, a second edge of said front surface, a third edge of said front surface, and a fourth edge of said front surface, and further wherein a plurality of aperture comprises four apertures, comprising a first, a second, a third and a fourth apertures disposed in a bottom surface of said recess located at edges of said recess formed between said bottom surface and respective a first, a second, a third and a fourth side walls of said recess.

7. A coupling system according to claim 5, wherein a circumference of said front surface is smaller than a circumference of said rear surface and said side walls are slanted between said front and rear surfaces such that said planar element forms a truncated pyramid.

8. A coupling system according to claim 7, wherein said recess is of a truncated pyramidal shape complementary to that of the planar element.

9. A coupling system according to claim 1, wherein a third set of said plurality of coupling elements comprise a magnetic elements disposed on the first and the second coupling arrangements, said magnetic elements arranged to attract the first coupling arrangement to the second coupling arrangement, and vice versa, to maintain said coupling orientation through said coupling/decoupling operation and to couple said accessory to said mount in said coupled configuration.

10. A coupling system according to claim 9, wherein a first magnetic element of said magnetic elements is disposed in a front surface of a planar element and a second magnetic element of said magnetic elements is disposed in a bottom surface of a recess, said front surface of said planar element and said bottom surface of said recess facing one another when said accessory and said mount are in said coupling/decoupling orientation.

11. A coupling system according to claim 9, wherein said magnetic elements comprise a permanent magnets.

12. A coupling system according to claim 9, wherein said magnetic elements comprise a rare-earth magnets.

13. A coupling system according to claim 12, wherein said rare-earth magnets comprise a neodymium element.

14. A coupling system according to claim 10, wherein a surface of said second magnetic element forms a portion of said bottom surface of said recess.

15. A coupling system according to claim 14, wherein a portion of a remaining portion of said bottom surface is configured to a space said second magnetic element from a plurality of apertures.

16. A coupling system according to claim 1, further comprising a first electro-mechanical coupling element disposed on said coupling end of said mount and forming part of said first coupling arrangement, and a second electro-mechanical coupling element, complementary to said first electro-mechanical coupling element, forming part of said second coupling arrangement.

17. A coupling system according to claim 16, wherein said first electro-mechanical coupling element is located on a front surface of a planar element and said second electro-mechanical coupling element is located in a bottom surface of a recess.

18. A coupling system according to claim 16, wherein said first electro-mechanical coupling element comprises a plurality of pins and said second electro-mechanical coupling element comprises a corresponding plurality of receivers for receiving said pins.

19. A coupling system according to claim 16, wherein said first electro-mechanical coupling element comprises a plurality of blades and said second electro-mechanical coupling element comprises a corresponding plurality of pairs of blades defining spaces between each pair for receiving a corresponding one of said plurality of blades of said first electro-mechanical coupling element.

20. A coupling system according to claim 1, wherein said mount comprises a mount for location in a vehicle.

21. A coupling system according to claim 20, wherein said mount is configured for said mount end to be receivable in a mount base unit, the mount base unit locatable against a vehicle surface.

22. A coupling system according to claim 20, wherein said accessory comprises a camera for recording video footage of an exterior and/or interior of the vehicle.

23. A coupling system according to claim 1, wherein said first coupling arrangement comprises a first orientation formation and said second coupling arrangement comprises a second orientation formation complementary to the first orientation formation, said first orientation formation and second orientation formation defining a coupling orientation of said accessory relative to said mount.

24. An accessory for a coupling system comprising,
an accessory connectable to a mount having a first coupling arrangement, the accessory comprising a second coupling arrangement disposed on a surface thereof;
the first coupling arrangement and the second coupling arrangement comprising a plurality of coupling elements configured to guide the accessory into an coupling orientation relative to said mount, to maintain said coupling orientation through a coupling/decoupling operation and to couple said accessory to said mount in a coupled configuration; and
wherein a first set of said plurality of coupling elements of the first and the second coupling arrangements comprise a formations disposed on one of the first and the second coupling arrangements and a complementary formations disposed on the other of the first and the second coupling arrangements, the formations receivable by and abuttable with the complementary formations in a non-retaining arrangement to maintain said coupling orientation through the coupling/decoupling operation and to inhibit a rotational movement of said mount relative to said accessory about all axes.

25. A mount for a coupling system comprising,
a mount having a mount end for mounting on a mounting surface and a coupling end comprising a first coupling arrangement;
the mount connectable to an accessory having a second coupling arrangement disposed on a surface thereof;
the first coupling arrangement and the second coupling arrangement comprising a plurality of coupling elements configured to guide the accessory into an coupling orientation relative to said mount, to maintain said coupling orientation through a coupling/decoupling operation and to couple said accessory to said mount in a coupled configuration; and
wherein a first set of said plurality of coupling elements of the first and the second coupling arrangements comprise a formations disposed on one of the first and the second coupling arrangements and a complementary formations disposed on the other of the first and the second coupling arrangements, the formations receivable by and abuttable with the complementary formations in a non-retaining arrangement to maintain said coupling orientation through the coupling/decoupling operation and to inhibit a rotational movement of said mount relative to said accessory about all axes.

\* \* \* \* \*

UNITED STATES PATENT AND TRADEMARK OFFICE
CERTIFICATE OF CORRECTION

PATENT NO. : 10,703,302 B1
APPLICATION NO. : 16/263415
DATED : July 7, 2020
INVENTOR(S) : Robert George Grant, Graham Keith Lambert and Ceri Hill Page 1 of 1

It is certified that error appears in the above-identified patent and that said Letters Patent is hereby corrected as shown below:

On the Title Page

Item (30), Under Foreign Application Priority Data the application number should read "Jan. 7, 2019 (GB)............1900214.6"

Signed and Sealed this
Eleventh Day of August, 2020

Andrei Iancu
*Director of the United States Patent and Trademark Office*